(12) United States Patent
Tseng

(10) Patent No.: US 7,525,700 B2
(45) Date of Patent: Apr. 28, 2009

(54) [SCANNING METHOD]

(76) Inventor: Jen-Shou Tseng, No. 18, Wen-Shen St., Chunan Chen, Miao-Li Hsien (TW)

( * ) Notice: Subject to any disclaimer, the term of this patent is extended or adjusted under 35 U.S.C. 154(b) by 1039 days.

(21) Appl. No.: 10/604,542

(22) Filed: Jul. 30, 2003

(65) Prior Publication Data

US 2004/0179248 A1 Sep. 16, 2004

(30) Foreign Application Priority Data

Sep. 17, 2002 (TW) .............................. 91121209 A

(51) Int. Cl.
*H04N 1/04* (2006.01)
*H04N 1/46* (2006.01)

(52) U.S. Cl. ................. 358/487; 358/475; 358/497; 358/506

(58) Field of Classification Search ............... 358/487, 358/475, 497, 494, 506, 509
See application file for complete search history.

(56) References Cited

U.S. PATENT DOCUMENTS

| | | | | |
|---|---|---|---|---|
| 5,467,172 A | * | 11/1995 | Liao | ............... 399/380 |
| 5,781,311 A | * | 7/1998 | Inoue et al. | ............... 358/475 |
| 5,880,858 A | * | 3/1999 | Jin | ............... 358/487 |
| 5,986,774 A | * | 11/1999 | Han | ............... 358/487 |
| 6,163,385 A | * | 12/2000 | Kajander | ............... 358/475 |
| 6,295,143 B1 | | 9/2001 | Lee et al. | |
| 6,426,823 B1 | * | 7/2002 | Hsiao et al. | ............... 359/196 |
| 6,556,721 B1 | * | 4/2003 | Wang et al. | ............... 382/282 |
| 6,614,563 B1 | * | 9/2003 | Batten et al. | ............... 358/487 |
| 6,989,918 B2 | * | 1/2006 | Haas et al. | ............... 358/487 |
| 2002/0039205 A1 | * | 4/2002 | Chang | ............... 358/487 |
| 2002/0051248 A1 | * | 5/2002 | Cook et al. | ............... 358/488 |

FOREIGN PATENT DOCUMENTS

| | | |
|---|---|---|
| CN | 1217515 | 5/1999 |
| CN | 1418002 | 5/2003 |

* cited by examiner

*Primary Examiner*—Houshang Safaipour
(74) *Attorney, Agent, or Firm*—Stolowitz Ford Cowger LLP

(57) ABSTRACT

A scanning method, applicable for a flatbed scanner with transparent scanning function. A plane light source with a distribution range covering the region to be scanned of a transparent document is provided. The distribution range of the plane light source is read by preview scanning, such that the position of the transparent document is captured.

30 Claims, 3 Drawing Sheets

[SCANNING METHOD]

CROSS REFERENCE TO RELATED APPLICATIONS

This application claims the priority benefit of Taiwan application serial no. 91121209, filed Sep. 17, 2002.

BACKGROUND OF INVENTION

1. Field of the Invention

The invention relates in general to a scanning method, and more particularly, to a method of extracting the position of a transmission document.

2. Related Art of the Invention

In recent years, the improvement in processing speed and data storage for processors and computer related products has greatly enhanced the graphics process. Consequently, image processing equipment such as optical scanners are being improved to comply with the requirement for high resolution and high-speed scan.

Currently, the flatbed scanner is one of the most commonly seen scanners in the market. The flatbed scanner has a document plane such as a glass flatbed for disposing a document or a picture. An optical scan module moving along such document plane is then used to scan the document or picture, so that the image of the document or picture can be extracted. The structure of the flatbed scanner is simple and highly expandable. Therefore, in addition to scanning the typical reflective document or picture, the flatbed applicable to scanning a transparent document or film is broadly used.

The conventional flatbed scanner with transparent scanning function is normally equipped with an external transparency adapter and an external film holder. Referring to FIG. 1, a conventional flatbed scanner with the transparent scanning function is shown. The scanner 100 includes an optical scan module 104, an original document plane 130, an external transparency adapter 120, and an external transparent film holder 110. A transparent document 102 is placed on the original document plane 130, the transparent film holder 110 is located over the original document plane 130, and the transparency adapter 120 over the original document plane 130 covers the scanning region of the transparent document 102. The optical scan module 104 scans the transparent document 102 along the original document plane 130.

Referring to FIG. 1 and FIG. 2 that illustrate the allocation of a transparency adapter for a conventional transparent scan and the transparent film holder, the transparent film holder 110 has a scan window 112, a calibration window 114, and four markers 116. While scanning the transparent document 102, the transparent film holder 110 is disposed on the original document plane 130 of the scanner 100. The transparent document 102 is then placed within the scan window 112. The external transparency adapter 120 is located over the markers 116 to cover both the scan window 112 and the calibration window 114.

In addition, the external transparency adapter 120 projects a plane light source onto the scan window 112 and the calibration window 114. The optical scan module then extracts the light beams transmitting through the scan window 112 and the calibration window 114, so as to discriminate the image of the transparent document 102. The calibration window 114 is used to read the signal of the light source in advance, such that the coverage of the scan window can be properly read.

The conventional transparent film holder provides the scanner the functions of scanning and positioning the transparent document. Once the transparent film holder is missing, the functions of correcting and reading the scan region are lost. The user cannot perform the scanning process for a transparent document anymore.

In addition, the scan window limits the size of the transparent document, and the transparent document has to be disposed within the scan window. This is very inconvenient for the users. Further, the correcting window occupies significant scan area. Therefore, the scanning range cannot be optimized.

Further, the external transparency adapter has to be aligned over the markers of the transparent film holder. Therefore, one cannot arbitrarily change the angle. The external transparency adapter is also an optional device that costs additional expense of the user.

SUMMARY OF INVENTION

The present invention provides a scanning method that uses a plane light source with coverage of a transparent document. The distribution range of the plane light source is confirmed by preview scanning. The transparent scan is then performed only on the coverage of the plane light source.

The present invention provides a scanning method suitable for use in a flatbed scanner with transparent scanning function. The flatbed scanner has an optical scan module and an original document plane for locating a transparent document. The optical scan module moves along the original document plane. The scanning method comprises the following steps. The transparent document is disposed on the original document plane. A plane light source with coverage including the region to be scanned of the transparent document is provided. The optical scan module is used to scan the original document plane once to read the distribution coverage of the plane light source. The optical scan module then scans the region within the coverage of the plane light source to extract the image of the transparent document.

The present invention further provides a method for capturing the scan position applicable for a flatbed scanner with transparent scanning function. The flatbed scanner has an optical scan module and an original document plane for placing a transparent document. The optical scan module moves along the original document plane. The method comprises the following steps. A plane light source with coverage including the scanning region of the transparent document is provided. The original document plane is scanned once using the optical scan module to read the distribution range of the plane light source, such that the scanning position is captured.

In one embodiment of the present invention, an external transparency adapter or a built-in transparency adapter is provided. The external or built-in transparency adapter is placed over the original document plane. In addition, the transparent document can be disposed with an arbitrary angle at an arbitrary position over the original document plane.

BRIEF DESCRIPTION OF DRAWINGS

These, as well as other features of the present invention, will become more apparent upon reference to the following drawings.

DETAILED DESCRIPTION

Figure 1:
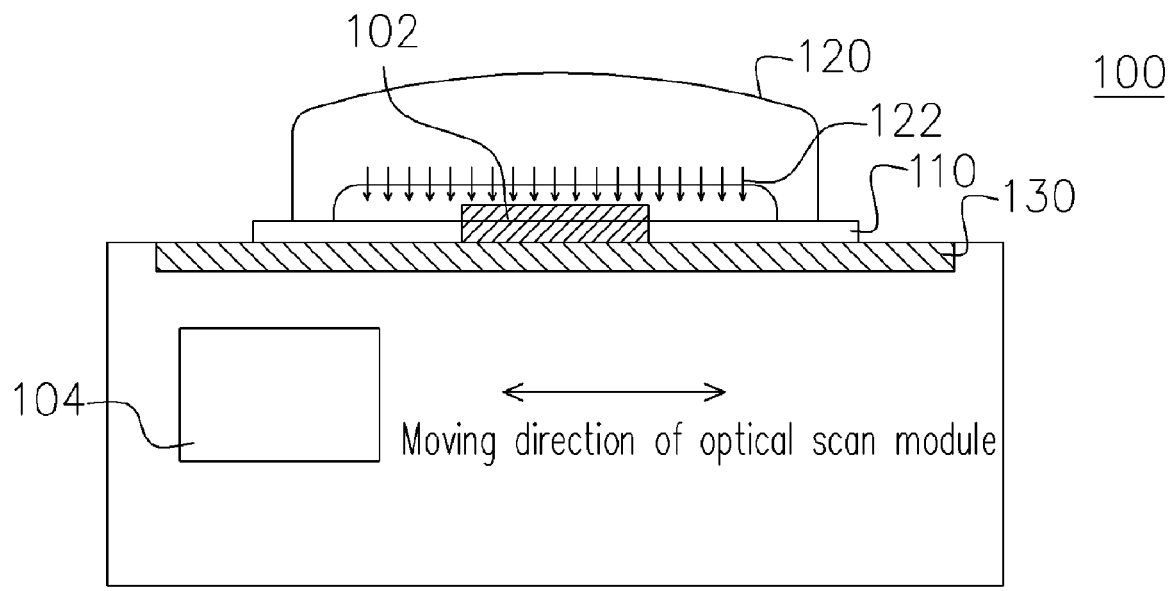
FIG. 1 shows a conventional scanner with the transparent scanning function.
Figure 2:
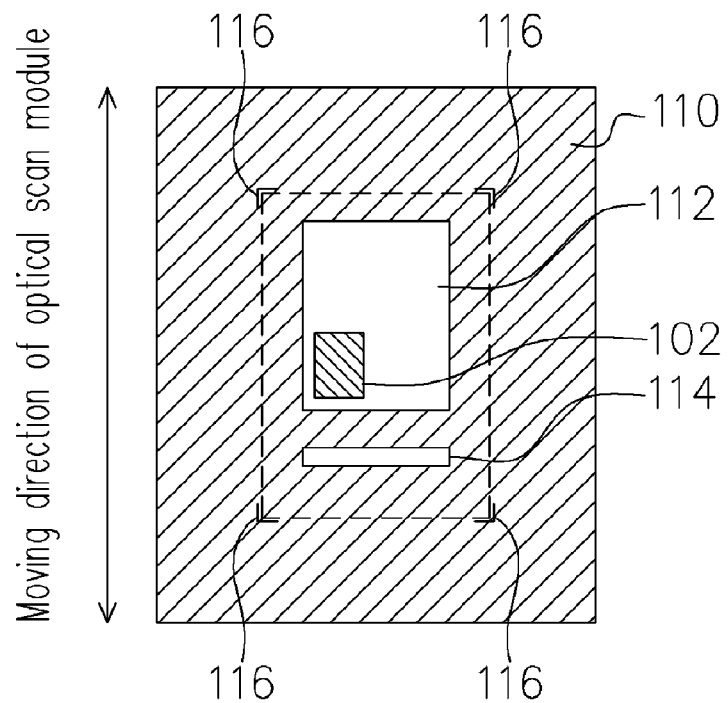
FIG. 2 shows the allocation of a transparency adapter and a transparent film holder for the conventional transparent scanning process.
Figure 3:
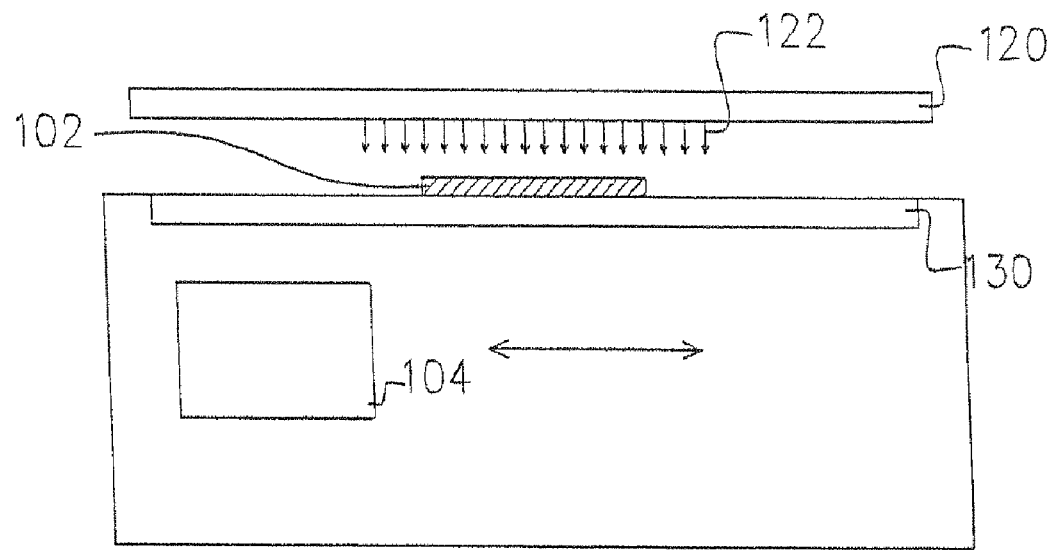
FIG. 3 shows the allocation of a scanner with transparent scanning function according to the present invention.

Referring to FIG. 3, a preferred embodiment of a scanner with transparent scanning function is illustrated. The transparent document 102 is placed on the original document plane 130. The optical scan module 104 moves along the original document plane 130 for scanning the transparent document 102. A plane light source 122 is placed over the original document plane 130 to radiate thereon. The distribution area of the plane light source 122 is larger than the scanning region of the transparent document 102. The plane light source 122 includes, for example, an external or a built-in transparency adapter 120 disposed over the original document plane 130.

The plane light source 122 used in this embodiment is not limited to the external light source. Instead, the plane light source 122 can be mounted to a top lid of the scanner in a built-in manner to perform transparent scanning. The built-in transparency adapter generally provides a larger distribution range of the light source. For example, the distribution range is as large as the area of the scan window. Therefore, the scanning range of the scanner is greatly enlarged.

The transparency adapter typically includes a light source, a light guiding board and a shell. While projecting on the light guiding board, the light beam emitted from the light source is guided into a plane light source distributed all over the light guiding board. The shell encloses the light guiding board, allowing the light to be converged on the original document plane as the plane light source.

As shown in FIG. 3, the difference from the prior art is that the external transparent film holder is not required. The distribution range of the plane light source 122 is confirmed by preview scanning. By extracting the transmitting light beam extracted by the optical scan module 104, the image of the transparent document 102 can be discriminated.

Figure 4:
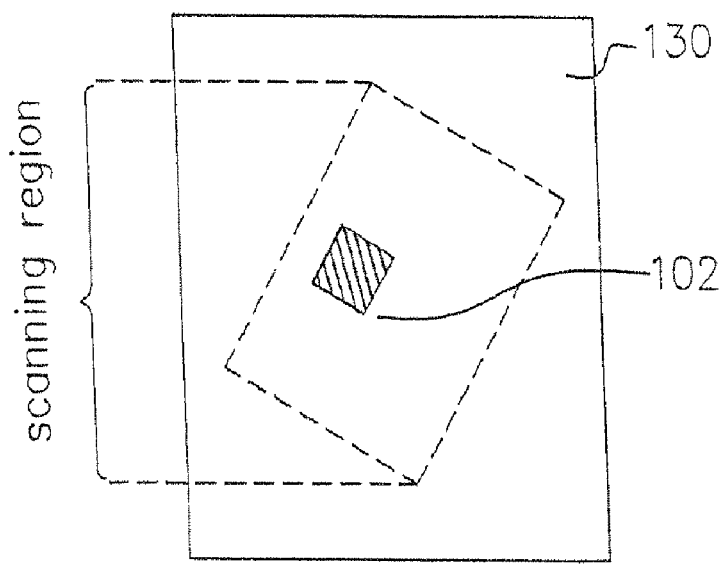
FIG. 4 shows the allocation of a transparent document and a transparency adapter according to the present invention.
Figure 5:
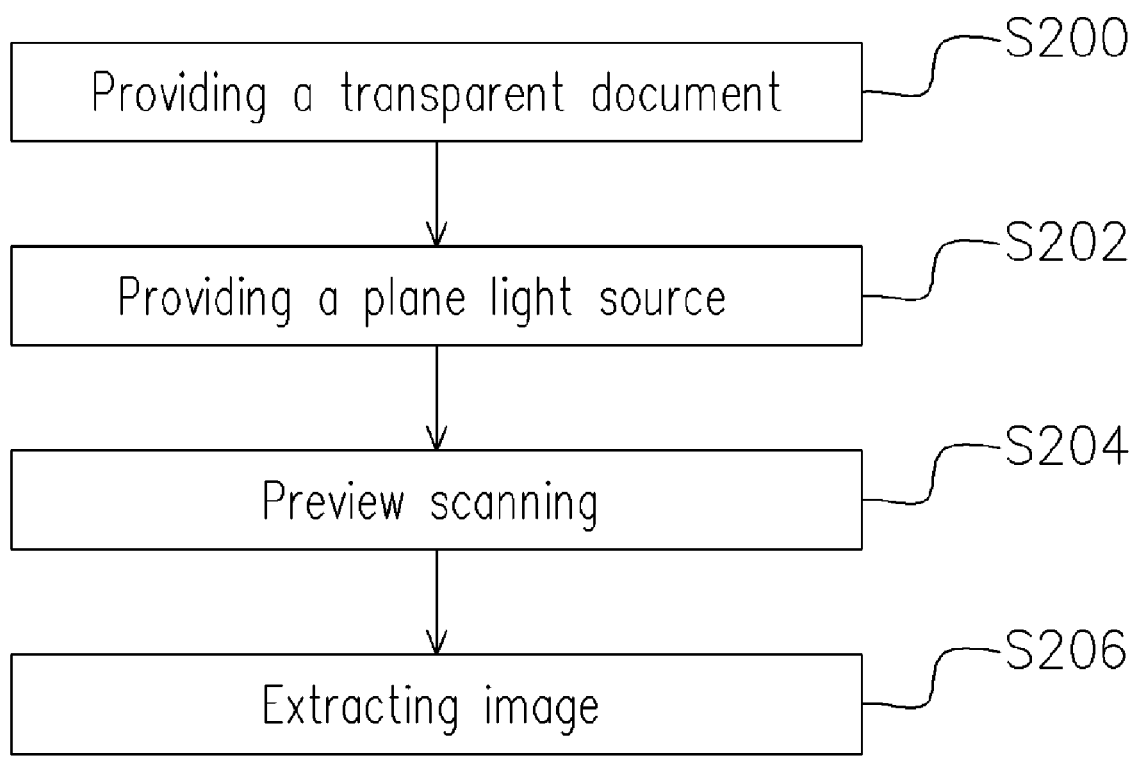
FIG. 5 shows a schematic drawing of a scanning method according to the present invention.

Referring to FIG. 4, an embodiment of a transparent document and transparency adapter is illustrated. The transparent document 102 can be disposed on any position on the original document plane 130 with any angle. The angle of the distribution range of the plane light source 122 can also be changed without being restricted only to the region of the transparent document 102 to be scanned Referring to FIG. 5, a process flow for a scanning method in one embodiment of the present invention is shown. The scanning method includes steps S200 which provides a transparent document, S202 which provides a plane light source, S204 which performs preview scanning, and S206 for image extraction.

In step S200, the transparent document 102 is placed on the original document plane 130 of the scanner 100, wherein the transparent document 102 can be, for example, a transparency, and a pattern or a document in positive or negative mechanism.

In step S202, the plane light source 122 with coverage including the region to be scanned of the transparent document 102 is provided, wherein the plane light source 122 can be, for example, a built-in or an external transparency adapter.

In step S204, the optical scan module 104 is used to scan the original document plane 130 once, so that the distribution range of the plane light source 122 is obtained. Also and, the optical scan module 104 can calibrate the brightness for the plane light source 122 via the calibration window 114. The calibration window 114 is, for example, disposed over the transparency adapter 120 and located within the distribution range of the plane light source 122. As a result, when the light emitted from the optical scan module 104 goes through the calibration window 114, and the brightness of the plane light source 122 can be calibrated.

In step S206, the optical scan module 104 is used to scan only the region covered by the plane light source 122 to extract the image of the transparent document 102.

Accordingly, the present invention provides a scanning method having at least the following advantages.

1. The scanning method of the invention does not require a transparent film holder to perform scanning on the transparent document and is more convenient.

2. In the scanning method of the invention, the transparent document can be placed at any position on the original document plane at any angle without positioning.

3. In the scanning method of the invention, the plane light source can be provided by either an external or a built-in transparency adapter.

4. In the scanning method of the invention, the orientation of the plane light source can be changed without using the positioning markers, so that it is more convenient to use.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

The invention claimed is:

1. A scanning method applicable for use in a scanner having a document plane for supporting a document, the method comprising:

scanning the document plane to obtain a distribution range of a light source, the distribution range defining a first area of the document plane;

scanning a second area of the document plane covered by the document to extract an image of the document, the second area being smaller than the first area, where the second area of the document plane corresponds to an orientation of the document positioned at an arbitrary angle on the document plane; and changing an orientation of the distribution range to correspond with the arbitrary angle of the document.

2. The method according to claim 1, where the orientation of the distribution range is changed by an angle offset from a moving direction of a scan module.

3. The method according to claim 1, where the first area of the document plane is as large as a scan window.

4. The method according to claim 1, where the light source comprises a built-in transparency adapter.

5. The method according to claim 1, where the distribution range is obtained from a preview scan.

6. The method according to claim 5, where the second area of the document plane is scanned subsequent to the preview scan.

7. The method according to claim 6, where only the second area of the document plane is scanned subsequent to the preview scan to extract the image of the document.

8. The method according to claim 1, further comprising scanning a calibration window to calibrate a brightness of the light source, wherein the calibration window is located within the distribution range.

9. A method of capturing a scanning position of a document in a flatbed scanner with transparent scanning functionality, the flatbed scanner having an optical scan module and an original document plane for supporting the document, the optical scan module moving generally parallel to the original document plane, the method comprising:

providing a planar light source with a distribution range covering a region of the original document plane to be scanned;

using the optical scan module to scan the original document plane once to read the distribution range, so as to capture the scanning position of the document on the original document plane;

changing an orientation of the planar light source to correspond with the scanning position of the document; and using the optical scan module to scan the document to obtain an image of the document.

10. The method according to claim 9, where providing the planar light source includes providing an external transparency adapter.

11. The method according to claim 9, where providing the planar light source includes providing an external transparency adapter over the original document plane.

12. The method according to claim 9, where providing the planar light source includes providing a built-in transparency adapter.

13. The method according to claim 9, where providing the planar light source includes providing a built-in transparency adapter over the original document plane.

14. The method according to claim 9, where using the optical scan module to scan the original document plane further comprises scanning a calibration window to calibrate brightness of the planar light source.

15. The method according to claim 9, where using the optical scan module to scan the document comprises scanning solely the region covered by the distribution range.

16. The method according to claim 9, where using the optical scan module to scan the original document plane comprises moving the optical scan module along the original document plane.

17. The method according to claim 9, where the scanning position comprises an arbitrary angle.

18. The method according to claim 17, where the orientation of the planar light source is changed corresponding to the arbitrary angle.

19. A scanning apparatus comprising:
an original document plane; and
an optical scan module, where the optical scan module is enabled to scan a transparent document by performing a preview scan of the original document plane to obtain a distribution coverage of a planar light source, by identifying a scan region corresponding to an arbitrary position of the transparent document on the original document plane, by changing an orientation of the distribution coverage corresponding to the arbitrary position, and by performing a scan of the scan region to extract an image of the transparent document.

20. The scanning apparatus according to claim 19, where the optical scan module is further enabled to scan a reflective document.

21. The scanning apparatus according to claim 19, where the optical scan module is further enabled to calibrate brightness of the planar light source via a calibration window.

22. The scanning apparatus according to claim 19, further comprising the planar light source.

23. The scanning apparatus according to claim 22, where the planar light source comprises an external transparency adapter, the external transparency adapter disposed over the original document plane.

24. The scanning apparatus according to claim 22, where the planar light source comprises a built-in transparency adapter, the built-in transparency adapter disposed over the original document plane.

25. The scanning apparatus according to claim 22, where the planar light source is mounted to a top lid of the scanning apparatus.

26. The scanning apparatus according to claim 19, where the distribution coverage is as large as a scan window of the scanning apparatus.

27. The scanning apparatus according to claim 19, where the optical scan module is further enabled to perform the scan to extract the image of the transparent document solely within the distribution coverage of the planar light source.

28. The scanning apparatus according to claim 19, where the scanning apparatus is operable to scan the transparent document without use of a transparent film holder.

29. The scanning apparatus according to claim 19, where the arbitrary position comprises an arbitrary angle.

30. The scanning apparatus according to claim 29, where the orientation of the distribution coverage is changed corresponding to the arbitrary angle.

* * * * *

UNITED STATES PATENT AND TRADEMARK OFFICE
CERTIFICATE OF CORRECTION

| | | |
|---|---|---|
| PATENT NO. | : 7,525,700 B2 | Page 1 of 1 |
| APPLICATION NO. | : 10/604542 | |
| DATED | : April 28, 2009 | |
| INVENTOR(S) | : Tseng | |

It is certified that error appears in the above-identified patent and that said Letters Patent is hereby corrected as shown below:

On the Title page Item (54), please replace the title "[SCANNING METHOD]" with --SCANNING METHOD--.

At column 1, line 1, please replace the title "[SCANNING METHOD]" with --SCANNING METHOD--.

Signed and Sealed this

Thirteenth Day of July, 2010

David J. Kappos
*Director of the United States Patent and Trademark Office*